United States Patent
He et al.

(10) Patent No.: US 10,644,964 B2
(45) Date of Patent: May 5, 2020

(54) METHOD AND SYSTEM FOR DISCOVERING AND PRESENTING ACCESS INFORMATION OF NETWORK APPLICATIONS

(71) Applicant: SHANGHAI NETIS TECHNOLOGIES CO., LTD., Shanghai (CN)

(72) Inventors: Xiaolin He, Shanghai (CN); Tao Wang, Shanghai (CN); Shuxi Wei, Shanghai (CN); Guanghui Yang, Shanghai (CN)

(73) Assignee: SHANGHAI NETIS TECHNOLOGIES CO., LTD., Shanghai (CN)

( * ) Notice: Subject to any disclaimer, the term of this patent is extended or adjusted under 35 U.S.C. 154(b) by 130 days.

(21) Appl. No.: 15/751,875

(22) PCT Filed: May 5, 2016

(86) PCT No.: PCT/CN2016/081057
§ 371 (c)(1),
(2) Date: Feb. 12, 2018

(87) PCT Pub. No.: WO2017/032044
PCT Pub. Date: Mar. 2, 2017

(65) Prior Publication Data
US 2018/0241638 A1  Aug. 23, 2018

(30) Foreign Application Priority Data
Aug. 24, 2015  (CN) .......................... 2015 1 0523983

(51) Int. Cl.
*H04L 12/00* (2006.01)
*H04L 12/24* (2006.01)
(Continued)

(52) U.S. Cl.
CPC .......... *H04L 41/22* (2013.01); *H04L 41/0213* (2013.01); *H04L 41/12* (2013.01);
(Continued)

(58) Field of Classification Search
CPC ..... H04L 41/12; H04L 43/18; H04L 41/0213; H04L 41/22; G06F 3/04815; G06F 3/04845
(Continued)

(56) References Cited

U.S. PATENT DOCUMENTS

| 6,249,795 B1 * | 6/2001 | Douglis | G06F 16/957 715/210 |
| 6,621,423 B1 * | 9/2003 | Cooper | G01C 21/36 340/995.12 |

(Continued)

FOREIGN PATENT DOCUMENTS

| CN | 105677648 A | * | 6/2016 | ............. H04L 41/12 |
| GB | 2371441 A | * | 7/2002 | ............. G04L 41/12 |

*Primary Examiner* — Frantz Coby
(74) *Attorney, Agent, or Firm* — Lei Yu

(57) ABSTRACT

A method and system for discovering and presenting access information of network applications includes: collecting access information between IP endpoints from a network packet collection; generating network diagrams; determining whether application component information needs to be configured, if yes, configuring application components, while if no, outputting the network diagrams; mapping the configuration information of the application components to the access information between the IP endpoints to obtain the access information based on the application components; updating the network diagrams according to the access information based on the application components; and outputting the network diagrams. In the present invention, collecting the access information of the application components through analyzing network packets does not affect the performance and security of computing nodes and network (Continued)

equipment in network environment; timely finding changes in access relations of the application components through snapshotting and comparing access relation views of the application components.

14 Claims, 2 Drawing Sheets

(51) Int. Cl.
 *H04L 12/26* (2006.01)
 *G06F 3/0481* (2013.01)
 *G06F 3/0484* (2013.01)
(52) U.S. Cl.
 CPC .......... *H04L 43/18* (2013.01); *G06F 3/04815* (2013.01); *G06F 3/04845* (2013.01)
(58) Field of Classification Search
 USPC ........................................ 709/218, 223, 224
 See application file for complete search history.

(56) References Cited

U.S. PATENT DOCUMENTS

| | | | | |
|---|---|---|---|---|
| 7,386,531 B2* | 6/2008 | Kiessig | ................... | G06F 16/10 |
| 7,565,503 B2* | 7/2009 | Fujibayashi | .......... | G06F 3/0607 |
| | | | | 707/999.202 |
| 8,037,190 B2* | 10/2011 | Apte | ....................... | H04L 67/02 |
| | | | | 709/227 |
| 8,117,230 B2* | 2/2012 | Shaji | ..................... | H04L 41/082 |
| | | | | 707/786 |
| 8,316,386 B2* | 11/2012 | Kumar | ................... | G06F 9/546 |
| | | | | 709/218 |
| 8,561,146 B2* | 10/2013 | Faitelson | .............. | G06F 21/604 |
| | | | | 726/4 |
| 8,825,820 B2* | 9/2014 | Gerber | ................... | H04L 43/08 |
| | | | | 709/223 |
| 9,009,795 B2* | 4/2015 | Faitelson | .............. | G06F 21/604 |
| | | | | 726/4 |
| 9,420,397 B1* | 8/2016 | Sheriff | .................... | H04W 4/50 |
| 9,461,969 B2* | 10/2016 | Watt | .................... | H04L 63/0272 |
| 9,749,282 B2* | 8/2017 | Jain | ......................... | H04L 51/32 |
| 9,774,600 B1* | 9/2017 | Streete | ................ | G06F 21/31 |
| 9,898,344 B2* | 2/2018 | Kalali | ..................... | H04L 67/34 |
| 2007/0192155 A1* | 8/2007 | Gauger | ................. | G06Q 10/00 |
| | | | | 705/301 |
| 2007/0288292 A1* | 12/2007 | Gauger | ................. | G06Q 10/00 |
| | | | | 405/9 |
| 2009/0013070 A1* | 1/2009 | Srivastava | .......... | H04L 41/5038 |
| | | | | 709/224 |
| 2009/0083530 A1* | 3/2009 | Nishijima | ........... | G06F 15/7867 |
| | | | | 713/1 |
| 2013/0006664 A1* | 1/2013 | Chaliparambil | ....... | G06Q 10/10 |
| | | | | 705/3 |
| 2014/0090012 A1* | 3/2014 | Lim | ...................... | G06Q 10/10 |
| | | | | 726/1 |
| 2015/0074656 A1* | 3/2015 | Eramian | ................... | G06F 8/61 |
| | | | | 717/168 |
| 2015/0317286 A1* | 11/2015 | Wang | ..................... | G06F 9/451 |
| | | | | 715/788 |

* cited by examiner

METHOD AND SYSTEM FOR DISCOVERING AND PRESENTING ACCESS INFORMATION OF NETWORK APPLICATIONS

CROSS REFERENCE OF RELATED APPLICATION

This is a U.S. National Stage under 35 U.S.C. 371 of the International Application PCT/CN2016/081057, filed May 5, 2016, which claims priority under 35 U.S.C. 119(a-d) to CN 201510523983.1, filed Aug. 24, 2015.

BACKGROUND OF THE PRESENT INVENTION

Field of Invention

The present invention relates to discovery of network application access relation, and specifically to a method and system for discovering and presenting access information of network applications.

Description of Related Arts

With the increase of data center scale and number of applications, network applications have introduced site and cluster among other deployment methods to achieve high availability and high expandability. As a result, the number of applications grows more and more, application frameworks become more and more complex, and application deployment scale becomes increasingly larger, which brings great difficulties to the management and maintenance of applications and networks; and especially after the application deployment changes, it is very difficult for an administrator to rapidly obtain updated and complete application view and to manage historical views.

The existing network view, basically achieved on the basis of topology view of network equipment and IP node, reflects the network connection relations of the equipment (such as servers, exchange boards and routers) deployed for applications, cannot reflect connection relation and access information of upper-level application, and in particular, cannot handle the condition of deploying applications according to sites and clusters. Meanwhile, the existing network view builds node position relations mainly by acquiring information from agent programs (such as, SNMP agent) set for a network equipment (such as, router and exchange board) or each network node. This mode, on one hand, affects the performance of the network equipment and nodes, and on the other hand causes various hidden dangers against the network equipment.

The following relevant patent documentations are found through retrieval:

Relevant Patent Documentation 1

Application (Patent) number: CN 201310241472.1. Title: Method and Device for Presenting Dynamic Configuration of Network Topology.

This patent documentation relates to a method and device for presenting dynamic configuration of network topology, the method including: collecting information about each network component in the network topology, wherein the information about the network components at least includes the network components and connection relations among the network components; presenting the network topology on a display interface according to the information about each of the network component; and reallocating each network component in the network topology presented on the display interface and the connection relations among all the network components.

Comparison of Technical Essentials:

1. Differences in data collecting methods: in this patent documentation, information on network components and information on access relations of static network components are collected by deploying LLDP-based agent programs in network environment for drawing topological graphs. Information collecting method used in this patent documentation affects computing performance and security defense of network components, while using information on static access relation to draw topological graphs cannot timely reflect current network topology relations. However, in the present invention, information is collected through side-channel analysis on data packets, preventing affecting performance and security of each network component and computing node; and meanwhile, the information access model in current network environment can be immediately reflected.

2. Differences in targets of presented connection relations: connection relations among network components presented in this patent documentation correspond to physical topological relations among all components. However, the present invention presents access relations among components at application level; the access relations are logical access relations built on physical connection relations; and information and characteristics of inter access among application components in current environment can be directly presented.

Relevant Patent Documentation 2

Application (Patent) number: CN 201210326529.3. Title: Method of Achieving Web Network Topology Based on SNMP and HTML5.

This patent documentation provides a method of achieving web network topology based on SNMP and HTML5, including: Step 1, choosing custom topology or self-discovering topology; Step 2, when choosing self-discovering topology, using SNMP to detect all resources and inputting detected self-discovering network topological resources into data base; Step 3, analyzing and obtaining self-discovering network topological relations according to self-discovering network topological resources; Step 4, displaying topological resources on canvas on network topology edit page according to attribute of topological resources, calculating coordinates of all topological resources on the network topology edit page, using drawing function of Canvas of HTML5 to draw topology management connection lines according to self-discovering network topological relation; and Step 5, testing topological resources for network availability according to IP of topological resources, inputting the problems found into alarm subsystem to give an alarm. This method uses HTML5 for network topology presentation of B/S structure. Users can choose custom network topology and auto network topology.

Comparison of Technical Essentials:

1. Differences in network information collecting methods: method in this patent documentation is to collect configuration information of the network component supporting SNMP, through SNMP agent program, for drawing connection relations of the components. This method is dependent on implementation of SNMP, while affecting performance and security of network equipment. However, in the present invention, information is collected through side-channel analysis on data packets, preventing dependence on SNMP equipment, while not affecting performance and security of network equipment.

2. This patent documentation draws access relations of network equipment, while the present invention presents access relations among network applications.

3. This patent documentation indicates drawing topological graphs through HTML5 art, while the present invention provides a method of drawing graphs and is not limited to the specific arts applied.

SUMMARY OF THE PRESENT INVENTION

In view of defects in the current arts, an objective of the present invention is to provide a method and system for discovering and presenting access information of network applications. The technical problems to be solved are embodied in the following points:

1) introducing analytic art of network data packets, without affecting performance and security of a network equipment and computing nodes in the environment deployed for applications;

2) rapidly presenting and operating access information views based on IP endpoints in a visualization way;

3) rapidly generating access information views based on application components through flexible configuration modes of application components;

4) timely acquiring and managing view changes.

A method for discovering and presenting access information of network applications, provided by the present invention, comprises steps of:

Step 1: collecting access information between IP endpoints from network packet collections collected from environment deployed for network applications;

Step 2: generating network diagrams corresponding to the access information between the IP endpoints; determining whether application component information needs to be configured, if yes, carrying out Step 3; and if no, carrying out Step 5;

Step 3: mapping configuration information of application components to the access information between the IP endpoints, and obtaining access information based on the application components;

Step 4: updating the network diagrams according to the access information based on the application components; and Step 5: outputting the network diagrams.

Preferably, the access information between the IP endpoints includes access relations between the IP endpoints.

Preferably, the Step 1 comprises:

Step 1.1: collecting and managing the network packet collections, which comprises:

Step 1.1.1: importing captured network packet collections, or converting actual network flow of fixed duration captured by network cards to the network packet collections; and Step 1.1.2: memorizing and managing the network packet collections, which comprises:

Step 1.1.2.1: uniquely identifying and memorizing the network packet collections to support management for multiple network packet collections; and Step 1.2: analyzing IP layer and application layer protocols of network packets in the network packet collections, collecting and memorizing access information between IP endpoints, wherein the step 1.2 comprises:

Step 1.2.1: after carrying out IP fragmentation and reassembly and reassembly of application layer for the network packets, picking up the access information between the IP endpoints included in each network packet according to network protocols; and Step 1.2.2: memorizing and picking up the access information between the IP endpoints, specifically: memorizing the access information between the IP endpoints into data packets.

Preferably, the Step 2 comprises:

Step 2.1: generating network diagrams containing points and edges according to the access information between the IP endpoints; wherein one point represents one IP endpoint and is uniquely identified by IP address, and one edge represents data access existing between two IP endpoints and is uniquely identified by access information of source IP address and destination IP address served by the two IP endpoints respectively; and Step 2.2: associating one or more of following information on a network diagram:

information of the IP endpoints: for recording the access information of the source IP address or the destination IP address served by the IP address of the IP endpoints; and information of connection between the IP endpoints: for recording the access information of edges of the source IP address or the destination IP address served by the IP address of the IP endpoints.

Preferably, the Step 3 comprises:

Step 3.1: configuring application components which comprises:

configuring the application components by importing configuration information files or carrying out interactive manipulation on the network diagram;

Step 3.2: managing the application components, including memorizing, editing and deleting the application components; and Step 3.3: associating the configuration information of the application components with the access information between the IP endpoints, generating the access information based on application components, wherein the configuration information of the application components comprises lists of IP addresses and/or ports.

Preferably, the Step 4 comprises:

Step 4.1: for the network diagram, merging the IP endpoints configured in a same application component to one application component endpoint, which is represented by a point; merging the edge of the IP endpoints configured in the same application component and opposed by end with the same end node with edge of node of corresponding opposite end;

Step 4.2: marking application access directions on the edges of the endpoints of application components according to port configuration information in configuration information of the application components; and Step 4.3: taking the configuration information contained in application component endpoints as the dimension, associating matching access information between the IP endpoints.

Preferably, the Step 5 comprises:

Step 5.1: creating a snapshot of a network diagram, which comprises using a data structure to represent a status of current network diagram, wherein the status of the network diagram comprises at least one member selected from a group consisting of:

attributes of every point and edge; access information of every point and access information between corresponding endpoints; and access information based on application components;

Step 5.2: presenting snapshots, according to memorized data structure of the network diagram, drawing points and edges, and presenting through an interactive interface; and Step 5.3: comparing the snapshots of different network diagrams, and presenting differences in the points and the edges of the different network diagrams.

Preferably, the access relation between the IP endpoints is at least one member selected from a group consisting of: source IP address, destination IP address, source IP port, destination IP port, information of flag bits of application layer protocol, character field of application layer, load size, and protocol mode of application layer.

Preferably, the interactive manipulation is at least one member selected from a group consisting of: zooming in and zooming out network diagrams; two-dimensional and three-dimensional movements of network diagrams; point displacement and following edge displacement; deleting points and edges; annotating points or edges; merging points and merging edges; splitting merged points, and generating edges.

A system for discovering and presenting access information of network applications is provided by the present invention, the system for discovering and presenting the access information of the network applications is used for executing the above-mentioned method for discovering and presenting the access information of the network applications.

Preferably, the system for discovering and presenting the access information of the network applications comprises:

a network packet collecting module: for picking up the access information between IP endpoints from network packet collections collected from environment deployed for the network applications;

an interface interactive processing module: for generating network diagrams corresponding to the access information between the IP endpoints; determining whether application component information needs to be configured, if yes, triggering an application component configuring module to continue; if no, triggering a network diagram managing module to continue;

an application component configuring module: for mapping configuration information of application components to the access information between the IP endpoints, and obtaining access information based on the application components;

a data processing module: for updating the network diagrams according to the access information based on the application components; and a network diagram managing module: for outputting the network diagrams.

Preferably, the access information between the IP endpoints includes access relations between the IP endpoints.

Preferably, the network packet collecting module comprises:

a first processing device, for collecting and managing the network packet collections, wherein the first processing device comprises a second processing device and a third processing device;

the second processing device, for importing captured network packet collections, or converting actual network flow of fixed duration captured by network cards to the network packet collections;

the third processing device, for memorizing and managing the network packet collections, wherein the third processing device comprises a fourth processing device;

the fourth processing device, for uniquely identifying and memorizing the network packet collections to support management for multiple network packet collections; and a fifth processing device, for analyzing IP layer and application layer protocols of network packets in the network packet collections, collecting and memorizing access information between IP endpoints, wherein the fifth processing device comprises a sixth processing device and a seventh processing device;

the sixth processing device, for picking up the access information between the IP endpoints included in each network packet according to network protocols after carrying out IP fragmentation and reassembly and reassembly of application layer for the network packets;

the seventh processing device, for memorizing and picking up the access information between the IP endpoints, specifically: memorizing the access information between the IP endpoints into data packets.

Preferably, the interface interactive processing module comprises:

an eighth processing device, for generating network diagrams containing points and edges according to the access information between the IP endpoints; wherein one point represents one IP endpoint and is uniquely identified by IP address, and one edge represents data access existing between two IP endpoints and is uniquely identified by access information of source IP address and destination IP address served by the two IP endpoints respectively; and a ninth processing device, for associating one or more of following information on a network diagram:

information of the IP endpoints: for recording the access information of the source IP address or the destination IP address served by the IP address of the IP endpoints; and information of connection between the IP endpoints: for recording the access information of edges of the source IP address or the destination IP address served by the IP address of the IP endpoints.

Preferably, the application component configuring module comprises: a tenth processing device, for configuring application components, and specifically for configuring the application components by importing configuration information files or carrying out interactive manipulation on the network diagram;

an eleventh processing device, for managing the application components, including memorizing, editing and deleting application components; and a twelfth processing device, for associating the configuration information of the application components with the access information between the IP endpoints, generating the access information based on application components, wherein the configuration information of the application components comprises lists of IP addresses and/or ports.

Preferably, the data processing module comprises:

a thirteenth processing device, for merging, in terms of the network diagram, the IP endpoints configured in a same application component to one application component endpoint, which is represented by a point; merging the edge of the IP endpoints configured in the same application component and opposed by end with the same end node with edge of node of corresponding opposite end;

a fourteenth processing device, for marking application access directions on the edges of the endpoints of application components according to port configuration information in configuration information of the application components; and a fifteenth treatment device, for taking the configuration information contained in application component endpoints as the dimension, associating matching access information between the IP endpoints.

Preferably, the network diagram managing module comprises:

a sixteenth processing device, for creating a snapshot of a network diagram, and specifically for: using a data structure to represent a status of current network diagram, wherein the status of the network diagram is at least one member selected from a group consisting of:

attributes of every point and edge; access information of every point and access information between corresponding endpoints; and access information based on application components;

a seventeenth processing device, for presenting snapshots, according to memorized data structure of the network diagram, drawing points and edges, and presenting through an interactive interface; and an eighteenth processing device, for comparing the snapshots of different network diagrams, and presenting differences in the points and the edges of the different network diagrams.

Preferably, the access relation between the IP endpoints is at least one member selected from a group consisting of:

source IP address, destination IP address, source IP port, destination IP port, information of flag bits of application layer protocol, and load size.

Preferably, the interactive manipulation is at least one member selected from a group consisting of:

zooming in and zooming out network diagrams; two-dimensional and three-dimensional movements of network diagrams; point displacement and following edge displacement; deleting points and edges; annotating points or edges; merging points and merging edges; splitting merged points, and generating edges.

Compared with the prior art, the present invention has following beneficial effects:

1. Collecting the access information of the application components through analyzing the network packets, without affecting performance and security of the computing nodes and the network equipment in network environment.

2. Collecting the access information of the application components in current environment through the flexible configuration of the application components, and presenting in a better visualization way.

3. Snapshotting and comparing the access relation views of the application components can timely find changes in the access relations of the application components.

BRIEF DESCRIPTION OF THE DRAWINGS

Other features, objects, and advantages of the present invention will become more apparent from reading the description of non-limiting embodiments detailed with reference to the following drawings.

DETAILED DESCRIPTION OF THE PREFERRED EMBODIMENT

Figure 1:
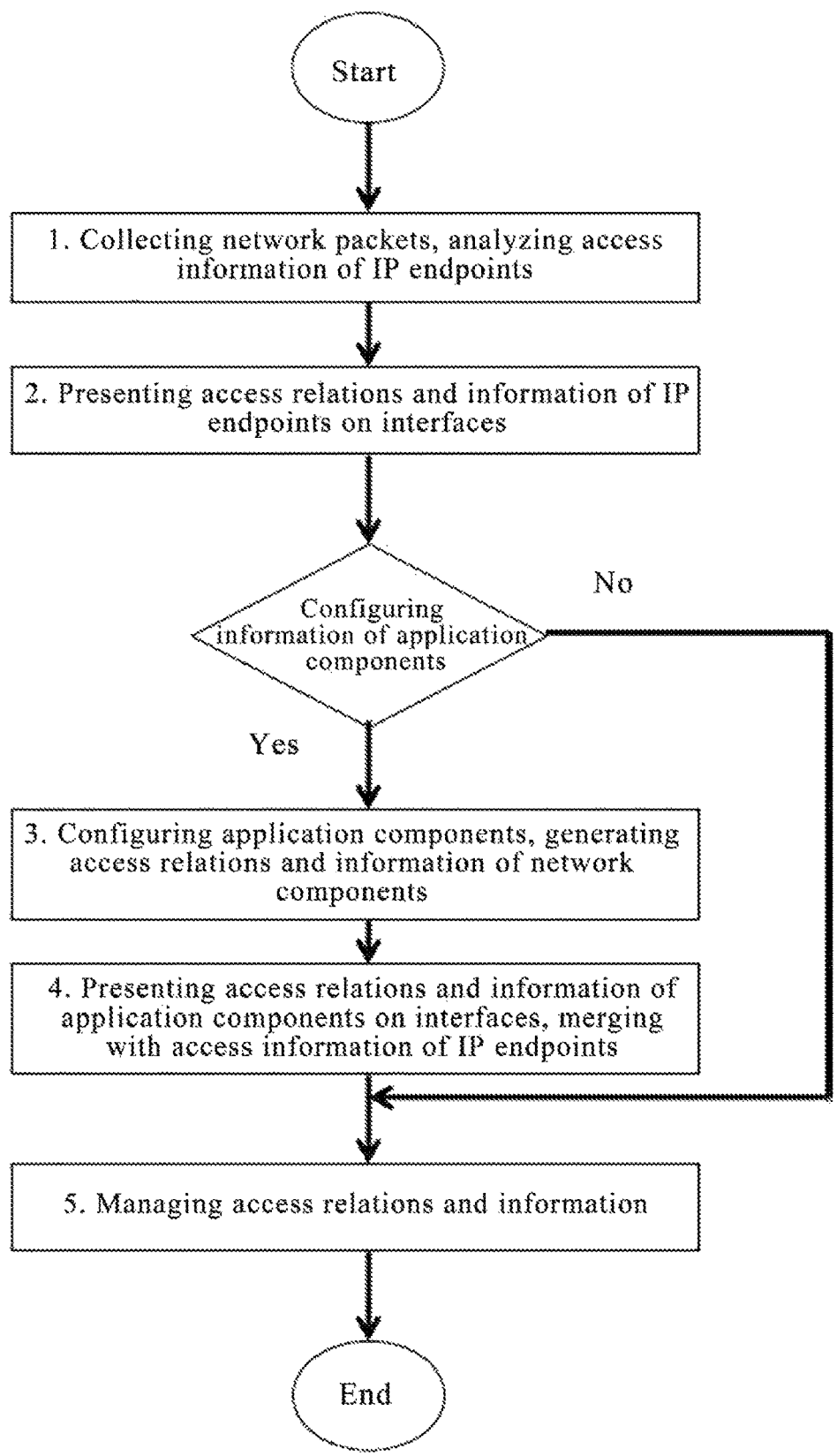
FIG. 1 is a flow chart of a method for discovering and presenting access information of network applications provided by the present invention.
Figure 2:
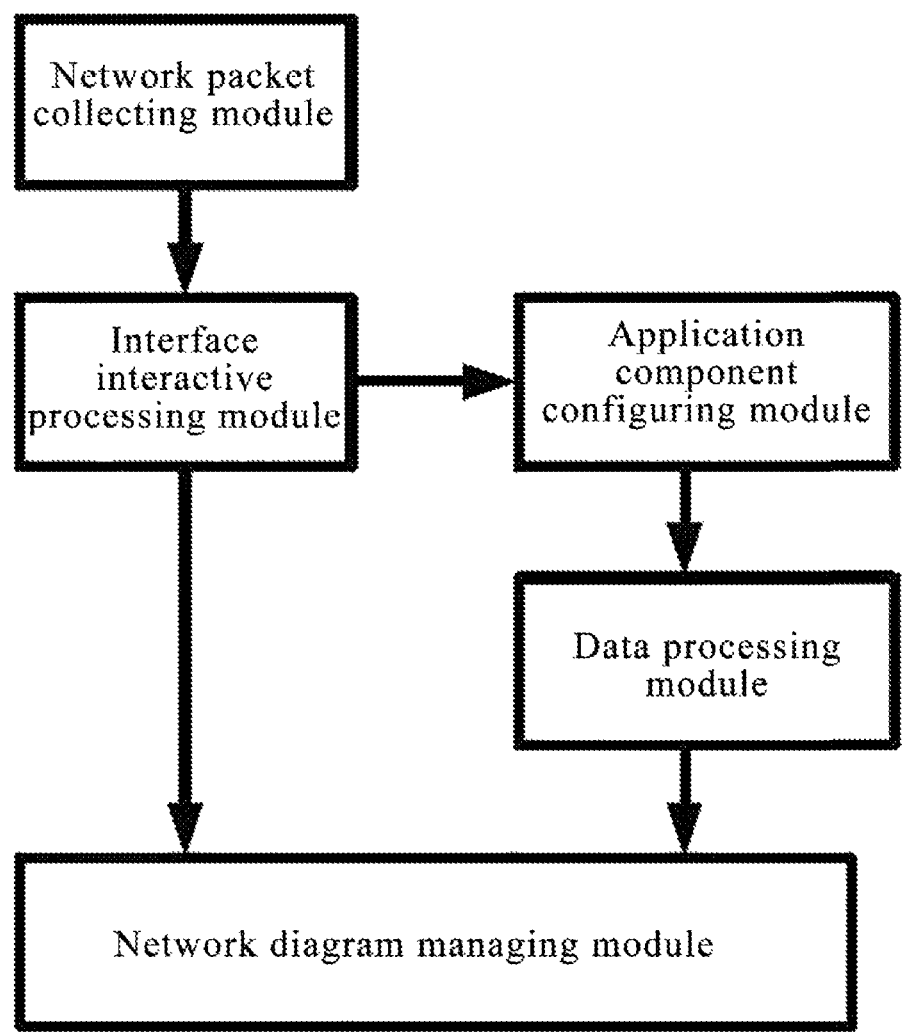
FIG. 2 is a structural view of a system for discovering and presenting access information of network applications provided by the present invention.

The present invention is described in detail as follows with reference to specific embodiments. The following embodiments will help provide further understanding of the present invention for those skilled in the art, and not in any way limit the present invention. It should be noted that several changes and improvements can be made without departing from concept of the invention for ordinary persons skilled in the art. All these fall within the protection scope of the invention.

The present invention relates to a method of automatically discovering and sorting network application access relations, generating access relations and information among application components through analyzing protocols of network packets and configuration of application components, and presenting and operating in a visualization way through a view present art.

The method provided by the present invention comprises steps of:

Step 1: collecting network packet collections in an environment deployed for the network applications, picking up the access information between IP endpoints from network packets through a network protocol analysis art, wherein the access information at least comprises access relations between the IP endpoints, i.e., source IP address, destination IP address, source IP port, destination IP port, information of flag bits of application layer protocol, and load size; the access information can also comprise other indexes of the network packets in an IP layer and an application layer;

Step 2: presenting the access information between the IP endpoints on interfaces; determining whether application component information needs to be configured, if yes, carrying out Step 3; and if no, carrying out Step 5;

Step 3: configuring information of application components, and mapping the configuration information of the application components to the access information between the IP endpoints collected in Step 1, and obtaining configured application component access information; wherein the configuration information of the application components at least comprises lists of IP addresses and/or ports, wherein the list of ports comprises list of service ports, list of client ports and other configuration information related to applications;

Step 4: on a basis of Step 3, presenting the configured application component access information on the interfaces, and merging with unconfigured access relation information between the IP endpoints; and Step 5: managing access relation views of the application components and access relation views of IP nodes, wherein the step 5 comprises memorizing and comparing of snapshots.

Further, the Step 1 comprises:

Step 1.1: collecting and managing the network packet collections, wherein the step 1.1 comprises:

Step 1.1.1: collecting in a way of importing captured network packet collections, or in a way of capturing actual network flow of fixed duration from system network card, wherein for example, converting imported network packets in existing format to network packets in the system format and memorizing the network packets in the system format; also for example, converting network flow captured in real time to the format of the network packets of the system and memorizing; and Step 1.1.2: memorizing and managing the network packet collections, wherein the step 1.1.2 comprises;

Step 1.1.2.1: uniquely identifying and memorizing the packet collections to support management for multiple network packet collections; and Step 1.1.2.2: deleting through identifications of the packet collections; and Step 1.2: analyzing IP layer and application layer protocols of network packets, collecting and memorizing access information between IP endpoints, wherein the step 1.2 comprises:

Step 1.2.1: after carrying out IP fragmentation and reassembly and reassembly of application layer for the network packets, picking up the access information between the IP endpoints included in each network packet according to network protocols (such has IP/TCP); and Step 1.2.2: memorizing and picking up the access information between the IP endpoints, specifically, memorizing the access information between the IP endpoints into data packets, and making views for queries and statistics in different dimension, wherein for example, carrying out queries and statistics according to source or destination IP address, source or destination port, <source IP address, source port>, <destination IP address, destination IP port>.

Further, the Step 2 comprises:

Step 2.1: drawing point-edge network diagrams on interfaces according to the access information between the IP endpoints, wherein the step 2.1 comprises;

Step 2.1.1: drawing points and edges, wherein one point represents one IP endpoint and is uniquely identified by IP address;

one edge represents data access existing between two IP endpoints, i.e., access information, available in data base, with two IP endpoints serving as source IP address and destination IP address respectively, <Source IP address, destination IP address> are unique identification of one edge;

Step 2.1.2: through querying data base of the access information between the IP endpoints, drawing points of the source IP address and the destination IP address in each access information respectively on drawing layer, drawing connection between two points to form a network diagram, wherein other access information can be presented in point and ling diagramming; and Step 2.1.3: using a placement algorithm to calculate relative coordinates between the points and making placement, enhancing readability of the network diagrams and presenting visualization optimization;

Step 2.2: presenting more comprehensive access information between the IP endpoints on a basis of the network diagrams (not limited to presenting in forms or figures), wherein the comprehensive access information comprises:

information of the IP endpoints: according to the IP address, querying from data base of the access information between the IP endpoints to find out the access information with this address as the source or destination IP address, and presenting after merging or sequencing the information; and IP endpoint-IP endpoint connection information: according to <source IP address, destination IP address> combination, querying from data base of the access information between the IP endpoints to find out matching information, and presenting after merging or sequencing the information; and Step 2.3: interactive manipulation of network diagram interfaces, including but not limited to:

zooming in and zooming out the network diagrams;

two-dimensional and three-dimensional movements of the network diagrams;

point displacement and following edge displacement;

deleting points and edges;

presenting vertex induced subgraphs of specified IP endpoints;

presenting edge induced subgraphs of specified IP endpoint-IP endpoint connection lines;

annotating and highlighting points and edges;

merging points, i.e., merging more than two points into one point, wherein if these merged endpoints are connected to same endpoints, merging connection lines;

splitting merged points, splitting the points which are merged, and anew generating connection lines from opposite endpoints to the split endpoints;

matching and highlighting elements in network diagrams according to keywords; and recording and rolling back manipulations to views.

Further, the Step 3 comprises:

Step 3.1: configuring application components, wherein:

an application component is a single entity or a group of entities providing or accessing network application services, configuration information of the application component embodies a group of characters, which determine the component, comprising but not limited to the application's IP address list, service port list and client port list; applying by importing configuration information files or carrying out interactive manipulation on the network diagram layer generated in Step 2, or by other modes;

Step 3.2: managing the application components, including memorizing, editing and deleting the application components; and Step 3.3: carrying out cross correlating between the configuration information of the application components and the access information between the IP endpoints generated in Step 1, generating the access information based on application components, merging and collecting statistics of access information between IP endpoints matching application configuration information.

Further, the Step 4 comprises:

Step 4.1: on the basis of the network diagram output in Step 2, merging the IP endpoints configured in an application component to one application component endpoint, represented by application component icons, wherein in terms of related connection lines, if opposite end has a same node (such as the same IP endpoint or the same application component endpoint), merge the connection lines;

Step 4.2: marking application access directions on the connection lines of the application component endpoints according to the configured port information; and Step 4.3: taking the configuration information (such as, IP endpoints, and application component endpoints) contained in application components as a dimension, collecting and presenting the matching access information between the IP endpoints.

Further, the Step 5 comprises:

Step 5.1: creating snapshots of network diagrams, which comprises using a data structure to represent a current network diagram status, wherein the current network diagram status comprises attributes of every point and edge, access information data between corresponding endpoints, and access information data based on application components;

Step 5.2: presenting snapshots, according to memorized data structure of the network diagram, drawing points and edges, and presenting through an interactive interface;

Step 5.3: comparing the snapshots of different network diagrams, and presenting differences in the points and the edges; and Step 5.4: deleting the snapshots of the network diagrams, i.e., deleting the data structures used for representing network diagram statuses.

The present invention also provides a system for discovering and presenting access information of network applications, corresponding to the above-mentioned method for discovering and presenting access information of network applications, the system comprising:

a network packet collecting module: for picking up the access information between IP endpoints from network packet collections collected from environment deployed for the network applications;

an interface interactive processing module: for generating network diagrams corresponding to the access information between the IP endpoints; determining whether application component information needs to be configured, if yes, triggering an application component configuring module to continue; if no, triggering a network diagram managing module to continue;

an application component configuring module: for mapping configuration information of application components to the access information between the IP endpoints, and obtaining access information based on the application components;

a data processing module: for updating the network diagrams according to the access information based on the application components; and a network diagram managing module: for outputting the network diagrams.

Further, the network packet collecting module is adapted for collecting and memorizing the network packets. The network packets may come from files in the existing formats of existing packets, or from net flow captured by network cards in real time. The network packet collecting module comprises two submodules and is adapted for converting imported network packets in existing formats to network packets in the system formats and memorizing the network packets in the system formats; or converting network flow captured in real time to the format of network packets of the system and memorizing.

A network packet analyzing module is for picking up character data of IP layer and application layer after reassembling and analyzing the network packets to form the access information between the IP endpoints, and memorizing the information.

An application component configuring module is for collecting and managing the configuration information of the application components, and memorizing the information.

An interface interactive processing module is for collecting and merging the access information between the IP endpoints and the access information of the application components, for querying, merging and collecting, and according to the configuration information collected from the application component configuring module and the access information based on application components generated after associating access information between the IP endpoints. Specifically, the interface interactive processing module comprises:

a drawing submodule, for drawing the network diagrams based on the access information between the IP endpoints and the access information of the application components according to a certain layout;

an interactive manipulation submodule, for supporting editing, moving, merging, splitting, deleting, zooming out, highlighting, searching among other view manipulations of the network diagram elements;

an information presenting submodule, for presenting the information (comprising access information between IP endpoints and access information of application components) associated with each network diagram element in categories; and a network diagram managing module, for memorizing attribute and information of each network diagram element in a certain data format, comparing different network diagrams and finding out different elements, and handing over to the interface interactive processing module.

A preferred embodiment of the present invention comprises steps of:

Step A: designating a network interface and a collection time, capturing network flow and converting the network flow to a network packet, memorizing the packet;

Step B: collecting all IP endpoints and access information between IP endpoints through analyzing the network packet collected in Step A, wherein an IP address is a unique identification of an IP endpoint; the access information between the IP endpoints comprises collection {source IP address, source port number, destination IP address, destination port number, flow volume, flag bit};

Step C: merging the above access information between the IP endpoints to

View i, wherein:

the View i comprises bidirectional flow access information collection {endpoint A, A port, endpoint B, B port, A-B byte, B-A byte, total bytes, availability, flag bit} between the IP endpoints, i.e., accumulating flow volume into A-B flow when <source IP address, source port number> corresponds to <endpoint A, A port>, accumulating flow volume into B-A flow when <destination IP address, destination port number> corresponds to <endpoint B, B port>, total bytes are the sum of A-B byte and B-A byte; if the flow is unidirectional flow only, the availability is unidirectional, otherwise, bidirectional; flag bit succeeds to the flag bit in unidirectional access information; <A, B> represents the access relation of A accessing B; and View ii, wherein:

the View ii comprises the access information collection {endpoint A, A port, endpoint B, B port, A-B byte, B-A byte, total bytes, availability, flag bit} of single IP endpoint IPx, and the subscript x is serial number of the IP endpoint; i.e., picking up the record in which endpoint A is IPx and endpoint B is IPx from View i;

Step D: drawing network diagrams on an interactive interface, drawing endpoints A and B and connection lines thereof according to information in the View i, wherein an endpoint size can be embodied as a sum of bidirectional flow, related to the endpoint, which is the sum of accumulative total bytes in the View ii, and thickness of lines can be embodied as the sum of bidirectional flow, related to the endpoint, which is the sum of accumulative total bytes in the View i; meanwhile, presenting all access information between the IP endpoints, wherein the network diagram supports following interactive manipulations:

(1) highlighting edge induced subgraph, and presenting the access information between IP endpoints associated with the edge induced subgraph;

(2) highlighting point induced subgraph, and presenting all access information between the IP endpoints associated with the point induced subgraph, moving and deleting points or edges through dragging;

(3) moving a whole canvas by dragging or clicking direction keys;

(4) zooming out the canvas through operations with a mouse and a keyboard;

(5) renaming an endpoint by importing a mapping file of IP-endpoint name, or editing on the interface;

(6) merging points: dragging two IP endpoints to a same point to merge the two IP endpoints into one point; meanwhile, merging the overlapped edges associated with these endpoints into one line; and presenting after recalculating the access information between endpoints of the merged points and edges;

(7) splitting points: dragging a merged point away from the point formed after being merged to split the point merged, and presenting the access information after recalculating the merged points;

(8) searching elements: localizing and highlighting relevant elements by searching key information of interface elements (such as points and edges);

Step E: configuring information of the application components, which comprises:

Step E1: configuring the application components by importing mapping files of application component-IP address-service port-client port; and Step E2: configuring the application components by interface interactive manipulation, for example, associating the application components with the IP endpoints by merging and splitting points, also for example, configuring a service port and a client port of an application component through the interface; wherein this network diagram shows access relation and information between the application component and other ports (such as IP endpoints or other application components) after configuration, including marking access directions (client port pointing to service port) on edges; meanwhile, presenting access information based on application components;

repeating the Step E2 until a network view based on the application components is finally formed, wherein selectively presenting access relation among the application components, or all access network diagrams among endpoints; and Step F: managing snapshots of views which comprises:

a) periodically generating and storing snapshot views during the process of configuration of the application components;

b) deleting the snapshots;

c) picking up the snapshots, and presenting snap network diagrams and related access information; and d) comparing the snapshots, which comprises comparing current network diagram with previous snapshots, and presenting element differences in the network diagram in special forms (such as, in different colors).

It will be appreciated by those skilled in the art that, in addition to implementing the system and various devices provided by the present invention by purely computer-readable program code mode, the system and various devices provided by the present invention can achieve the same function in the form of logic gates, switches, special integrated circuit, programmable logic controller and microcontrollers by logically programming the method steps. Therefore, the system and various devices provided by the present invention may be considered as a kind of hardware component; the device for implementing various functions included therein may also be considered as a structure within a hardware component; the device for implementing various functions may be considered as a software module for implementing the method and a structure within the hardware component.

Specific embodiments of the present invention are described above. It shall be understood that the present invention is not limited to the above-mentioned specific embodiment, and those skilled in the art can make various changes and modifications within the scope of the claims, and it shall not affect the substance of the present invention.

What is claimed is:

1. A method for discovering and presenting access information of network applications, comprising steps of:
    (S1) collecting the access information between IP endpoints from network packet collections collected from an environment deployed for the network applications;
    (S2) generating network diagrams corresponding to the access information between the IP endpoints; determining whether application component information needs to be configured; if yes, carrying out a step of (S3), and if no, carrying out a step of (S5);
    (S3) mapping configuration information of application components to the access information between the IP endpoints, and obtaining the access information based on the application components;
    (S4) updating the network diagrams according to the access information based on the application components; and
    (S5) outputting the updated network diagrams, wherein the step of (S1) comprises:
    (S1.1) collecting and managing the network packet collections, wherein the (S1.1) comprises:
    (S1.1.1) importing the network packet collections, or converting actual network flow of fixed duration captured by network cards to the network packet collections; and
    (S1.1.2) memorizing and managing the network packet collections, wherein the (S1.1.2) comprises:
    (S1.1.2.1) uniquely identifying and memorizing the network packet collections to support management for multiple network packet collections; and
    (S1.2) analyzing IP layer and application layer protocols of network packets in the network packet collections, collecting and memorizing the access information between the IP endpoints, wherein the (S1.2) comprises:
    (S1.2.1) after carrying out IP fragmentation and reassembly and reassembly of the application layer for the network packets, picking up the access information between the IP endpoints included in each network packet according to network protocols; and
    (S1.2.2) memorizing and picking up the access information between the IP endpoints, which comprises memorizing the access information between the IP endpoints into the data packets.

2. The method for discovering and presenting the access information of the network applications according to claim 1, wherein the step of (S2) comprises:
    (S2.1) generating network diagrams containing points and edges according to the access information between the IP endpoints; wherein one point represents one IP endpoint and is uniquely identified by an IP address, and one edge represents a data access existing between two IP endpoints and is uniquely identified by access information of a source IP address and a destination IP address served by the two IP endpoints respectively; and
    (S2.2) associating one or more of following information on a network diagram:
        information of the IP endpoints: for recording the access information of the source IP address or the destination IP address served by the IP address of the IP endpoints; and
        information of connection between the IP endpoints: for recording the access information of the edges of the source IP address or the destination IP address served by the IP address of the IP endpoints.

3. The method for discovering and presenting the access information of the network applications according to claim 1, wherein the step of (S3) comprises:
- (S3.1) configuring the application components by importing configuration information files or carrying out interactive manipulations on the network diagram;
- (S3.2) managing the application components, comprising memorizing, editing and deleting the application components; and
- (S3.3) associating the configuration information of the application components with the access information between the IP endpoints, generating the access information based on the application components, wherein the configuration information of the application components comprises lists of IP addresses and/or ports.

4. The method for discovering and presenting the access information of the network applications according to claim 1, wherein the step of (S4) comprises:
- (S4.1) for the network diagram, merging IP endpoints configured in a same application component to one application component endpoint, which is represented by a point; merging edges of IP endpoints configured in the same application component and opposed by ends with the same end node with edges of nodes of a corresponding opposite end;
- (S4.2) marking application access directions on edges of endpoints of the application components according to port configuration information in the configuration information of the application components; and
- (S4.3) taking the configuration information contained in application component endpoints as a dimension, and associating matching the access information between the IP endpoints.

5. The method for discovering and presenting the access information of the network applications according to claim 1, wherein the step of (S5) comprises:
- (S5.1) creating a snapshot of a network diagram, which comprises using a data structure to represent a status of a current network diagram, and the status of the current network diagram is at least one member selected from a group consisting of:
  attributes of every point and edge; access information of every point and access information between corresponding endpoints thereof; and access information based on application components;
- (S5.2) presenting the snapshot, according to the memorized data structure of the network diagram, drawing points and edges, and presenting through an interactive interface; and
- (S5.3) comparing snapshots of different network diagrams to present differences in the points and edges of different network diagrams.

6. The method for discovering and presenting the access information of the network applications according to claim 1, wherein the access relation between the IP endpoints is at least one member selected from a group consisting of:
source IP address, destination IP address, source IP port, destination IP port, information of flag bits of application layer protocol, character field of application layer, load size, and protocol mode of application layer.

7. The method for discovering and presenting the access information of the network applications according to claim 3, wherein the interactive manipulations comprise at least one member selected from a group consisting of:
zooming in and zooming out network diagrams; two-dimensional and three-dimensional movements of network diagrams; point displacement and following edge displacement; deleting points and edges; annotating points or edges; merging points and merging edges; splitting merged points, and generating edges.

8. A system for discovering and presenting access information of network applications, comprising:
- a network packet collecting module for picking up the access information between IP endpoints from network packet collections collected from environment deployed for the network applications;
- an interface interactive processing module for generating network diagrams corresponding to the access information between the IP endpoints; determining whether application component information needs to be configured, if yes, triggering an application component configuring module to continue; if no, triggering a network diagram managing module to continue;
- an application component configuring module for mapping configuration information of application components to the access information between the IP endpoints, and obtaining access information based on the application components;
- a data processing module for updating the network diagrams according to the access information based on the application components; and
- a network diagram managing module for outputting the updated network diagrams, wherein the network packet collecting module comprises:
- a first processing device for collecting and managing the network packet collections, wherein the first processing device comprises a second processing device and a third processing device;
- the second processing device for importing the network packet collections, or converting actual network flow of fixed duration captured by network cards to the network packet collections;
- the third processing device for memorizing and managing the network packet collections, wherein the third processing device comprises a fourth processing device;
- the fourth processing device for uniquely identifying and memorizing the network packet collections to support management for multiple network packet collections; and
- a fifth processing device for analyzing IP layer and application layer protocols of network packets in the network packet collections, collecting and memorizing access information between IP endpoints, wherein the fifth processing device comprises a sixth processing device and a seventh processing device;
- the sixth processing device for picking up the access information between the IP endpoints included in each network packet according to network protocols after carrying out IP fragmentation and reassembly and reassembly of application layer for the network packets;
- the seventh processing device for memorizing and picking up the access information between the IP endpoints, specifically: memorizing the access information between the IP endpoints into data packets.

9. The system according to claim 8, wherein the interface interactive processing module comprises:
- an eighth processing device for generating network diagrams containing points and edges according to the access information between the IP endpoints; wherein one point represents one IP endpoint and is uniquely identified by IP address, and one edge represents data access existing between two IP endpoints and is uniquely identified by access information of source IP address and destination IP address served by the two IP endpoints respectively; and a ninth processing device for associating one or more of following information on a network diagram:

information of the IP endpoints: for recording the access information of the source IP address or the destination IP address served by the IP address of the IP endpoints; and information of connection between the IP endpoints: for recording the access information of edges of the source IP address or the destination IP address served by the IP address of the IP endpoints.

10. The system according to claim 9, wherein the application component configuring module comprises:

a tenth processing device for configuring the application components by importing configuration information files or carrying out interactive manipulation on the network diagram;

an eleventh processing device for managing the application components, including memorizing, editing and deleting application components; and a twelfth processing device for associating the configuration information of the application components with the access information between the IP endpoints, generating the access information based on application components, wherein the configuration information of the application components comprises lists of IP addresses and/or ports.

11. The system according to claim 10, wherein the data processing module comprises:

a thirteenth processing device for merging, in terms of the network diagram, the IP endpoints configured in a same application component to one application component endpoint, which is represented by a point; merging the edge of the IP endpoints configured in the same application component and opposed by end with the same end node with edge of node of corresponding opposite end;

a fourteenth processing device for marking application access directions on the edges of the endpoints of application components according to port configuration information in configuration information of the application components; and a fifteenth treatment device for taking the configuration information contained in application component endpoints as the dimension, associating matching access information between the IP endpoints.

12. The system according to claim 11, wherein the network diagram managing module comprises:

a sixteenth processing device for creating a snapshot of a network diagram, and specifically for: using a data structure to represent a status of current network diagram, wherein the status of the network diagram is at least one member selected from a group consisting of: attributes of every point and edge; access information of every point and access information between corresponding endpoints; and access information based on application components;

a seventeenth processing device for presenting snapshots, according to memorized data structure of the network diagram, drawing points and edges, and presenting through an interactive interface; and an eighteenth processing device for comparing the snapshots of different network diagrams, and presenting differences in the points and the edges of the different network diagrams.

13. The system according to claim 12, wherein the access relation between the IP endpoints is at least one member selected from a group consisting of:

source IP address, destination IP address, source IP port, destination IP port, information of flag bits of application layer protocol, and load size.

14. The system according to claim 13, wherein the interactive manipulation is at least one member selected from a group consisting of:

zooming in and zooming out network diagrams; two-dimensional and three-dimensional movements of network diagrams; point displacement and following edge displacement; deleting points and edges; annotating points or edges; merging points and merging edges; splitting merged points, and generating edges.

* * * * *